(12) United States Patent
Backus et al.

(10) Patent No.: US 12,711,527 B2
(45) Date of Patent: Aug. 18, 2026

(54) USER VERIFICATION WITH STATE MACHINES

(71) Applicant: Plaid Inc., San Francisco, CA (US)

(72) Inventors: John Backus, Miami, FL (US); Faris Toqan, Chicago, IL (US)

(73) Assignee: Plaid Inc., San Francisco, CA (US)

( * ) Notice: Subject to any disclaimer, the term of this patent is extended or adjusted under 35 U.S.C. 154(b) by 558 days.

(21) Appl. No.: 18/194,462

(22) Filed: Mar. 31, 2023

(65) Prior Publication Data

US 2023/0315826 A1 Oct. 5, 2023

Related U.S. Application Data

(60) Provisional application No. 63/362,280, filed on Mar. 31, 2022.

(51) Int. Cl.

| | |
|---|---|
| ***G06F 21/32*** | (2013.01) |
| ***G06F 3/0481*** | (2022.01) |
| ***G06F 3/0482*** | (2013.01) |
| ***G06F 8/38*** | (2018.01) |
| ***G06F 9/448*** | (2018.01) |
| ***G06F 9/451*** | (2018.01) |
| ***G06F 21/36*** | (2013.01) |
| ***G06Q 30/0601*** | (2023.01) |
| ***H04L 9/40*** | (2022.01) |

(52) U.S. Cl.

CPC ....... *G06Q 30/0609* (2013.01); *G06F 3/0481* (2013.01); *G06F 3/0482* (2013.01); *G06F 8/38* (2013.01); *G06F 9/4498* (2018.02); *G06F 9/451* (2018.02); *G06F 21/32* (2013.01); *G06F 21/36* (2013.01); *H04L 63/0876* (2013.01); *H04L 63/0884* (2013.01)

(58) Field of Classification Search

CPC ....................................................... G06F 21/32

See application file for complete search history.

(56) References Cited

U.S. PATENT DOCUMENTS 9,383,958 B1 * 7/2016 Trahan .................. G06F 16/957
11,935,101 B2 3/2024 Backus et al.

(Continued)

FOREIGN PATENT DOCUMENTS

CN 113468514 A 10/2021
KR 20140066626 A * 6/2014 ............ H04W 12/06

OTHER PUBLICATIONS

Arora et al., "Automated Checking of Conformance to Requirements Templates Using Natural Language Processing," IEEE, 2015, pp. 944-968.

(Continued)

*Primary Examiner* — Di Xiao
(74) *Attorney, Agent, or Firm* — Harrity & Harrity, LLP

(57) ABSTRACT

In some implementations, a verification system may initiate a state machine associated with a verification for the user, the state machine being associated with a plurality of verification procedures for the user. The verification system may modify a state of the state machine associated with a subsequent procedure of the verification procedures based on an outcome associated with a preceding procedure of the verification procedures. The verification system may determine a final state of the state machine based on an outcome associated with the subsequent procedure of the verification procedures.

20 Claims, 18 Drawing Sheets

(56) References Cited

U.S. PATENT DOCUMENTS

| | | | | |
|---|---|---|---|---|
| 2002/0133721 | A1 | 9/2002 | Adjaoute | |
| 2003/0105862 | A1 | 6/2003 | Villavicencio | |
| 2004/0243477 | A1 | 12/2004 | Mathai et al. | |
| 2007/0174260 | A1 | 7/2007 | Bachman et al. | |
| 2007/0178883 | A1 | 8/2007 | Nandagopal | |
| 2011/0047014 | A1 | 2/2011 | De Angelo | |
| 2013/0159188 | A1 | 6/2013 | Andon | |
| 2014/0173713 | A1 | 6/2014 | Zheng et al. | |
| 2014/0282978 | A1 | 9/2014 | Lerner et al. | |
| 2015/0271029 | A1* | 9/2015 | Iwamoto | H04L 41/40<br>709/223 |
| 2016/0142569 | A1 | 5/2016 | Akuzawa | |
| 2019/0213608 | A1 | 7/2019 | Ouyang et al. | |
| 2019/0364034 | A1 | 11/2019 | Alexander | |
| 2021/0209606 | A1 | 7/2021 | Herlands | |
| 2022/0254045 | A1 | 8/2022 | Boardman et al. | |
| 2022/0277070 | A1* | 9/2022 | Robert Jose | G06F 21/45 |
| 2022/0358434 | A1 | 11/2022 | Trivedi et al. | |
| 2023/0017508 | A1* | 1/2023 | Dabija | G06V 20/40 |
| 2023/0110496 | A1 | 4/2023 | Simmons et al. | |
| 2023/0127977 | A1* | 4/2023 | Haskin | H04L 67/12<br>340/5.72 |
| 2023/0315829 | A1 | 10/2023 | Backus et al. | |
| 2023/0319040 | A1 | 10/2023 | Backus et al. | |
| 2024/0193653 | A1 | 6/2024 | Backus et al. | |

OTHER PUBLICATIONS

Chabanne, H., et al., "A Verifiable System for Automated Face Identification," International Conference of the Biometrics Special Interest Group (BIOSIG), Sep. 2016, pp. 1-5.

* cited by examiner

100

100

100

300

320

330

340

USER VERIFICATION WITH STATE MACHINES

CROSS-REFERENCE TO RELATED APPLICATION

This Patent application claims priority to U.S. Provisional Patent Application No. 63/362,280, filed on Mar. 31, 2022, and entitled "USER VERIFICATION PROCEDURES AND INTERFACES." The disclosure of the prior Application is considered part of and is incorporated by reference into this Patent Application.

BACKGROUND

Know-your-client (KYC) requirements often impact verification procedures implemented for onboarding new users. For example, different countries may be associated with different KYC requirements.

SUMMARY

Some implementations described herein relate to a system for verifying a user. The system may include one or more memories and one or more processors communicatively coupled to the one or more memories. The one or more processors may be configured to initiate a state machine associated with a verification for the user, wherein the state machine is associated with a plurality of verification procedures for the user. The one or more processors may be configured to modify a state of the state machine associated with a subsequent procedure of the verification procedures based on an outcome associated with a preceding procedure of the verification procedures. The one or more processors may be configured to re-modify the state of the state machine associated with the subsequent procedure of the verification procedures based on an outcome associated with a repetition of the subsequent procedure of the verification procedures. The one or more processors may be configured to determine a final state of the state machine based on an outcome associated with the repetition of the subsequent procedure of the verification procedures.

Some implementations described herein relate to a method of verifying a user. The method may include initiating a state machine associated with a verification for the user, wherein the state machine is associated with a plurality of verification procedures for the user. The method may include modifying a state of the state machine associated with a subsequent procedure of the verification procedures based on an outcome associated with a preceding procedure of the verification procedures. The method may include determining a final state of the state machine based on an outcome associated with the subsequent procedure of the verification procedures.

Some implementations described herein relate to a non-transitory computer-readable medium that stores a set of instructions for generating user interfaces (UIs) for verifying a user for a device. The set of instructions, when executed by one or more processors of the device, may cause the device to generate a first visualization associated with a verification performed on a first user device. The set of instructions, when executed by one or more processors of the device, may cause the device to generate a link for a second user device. The set of instructions, when executed by one or more processors of the device, may cause the device to generate a second visualization for the first user device to provide an instruction to use the second user device. The set of instructions, when executed by one or more processors of the device, may cause the device to generate a third visualization associated with a verification performed on the second user device. The set of instructions, when executed by one or more processors of the device, may cause the device to generate a fourth visualization for the second user device to provide an instruction to return to the first user device. The set of instructions, when executed by one or more processors of the device, may cause the device to generate a fifth visualization associated with the verification performed on the first user device.

DETAILED DESCRIPTION

The following detailed description of example implementations refers to the accompanying drawings. The same reference numbers in different drawings may identify the same or similar elements.

Programming verification procedures according to know-your-client (KYC) requirements generally consumes significant power and processing resources. For example, multiple cycles of coding and debugging are used, and each cycle of coding and debugging consumes more power and processing resources. Furthermore, verification procedures generally should be performed in order to prevent users from circumventing KYC requirements. However, preventing circumvention of KYC requirements generally relies on exception coding (e.g., using catch and handle techniques). Exception coding consumes additional memory space, power, and processing resources, as well as many cycles of compiling and debugging.

When a user fails a series of verification procedures, the user generally has to repeat the series again. This consumes a significant amount of power and processing resources, both on a device used by the user and on a system performing the verification. Moreover, network resources are consumed because the device used by the user and the system performing the verification exchange messages in order to repeat the series of verification procedures.

Some implementations described herein provide for using state machines to manage a flow of verification procedures. The state machine prevents a user from circumventing KYC requirements by preventing the user from moving to unauthorized states. Accordingly, using a state machine conserves memory space, power, and processing resources as compared with coding, compiling, and debugging robust exception coding for the verification procedures.

Additionally, some implementations described herein provide for using state machines to repeat only a portion of a series of verification procedures. The state machine prevents a user from circumventing KYC requirements (e.g., by preventing the user from moving to unauthorized states) when the user repeats failed verification procedures in the series but still allows for reuse of successful verification procedures in the series without additional input from the user. Accordingly, using a state machine conserves power, processing resources, and network resources as compared with repeating the full series of verification procedures.

FIGS. 1A-1E are diagrams of an example 100 associated with user verification with state machines. As shown in FIGS. 1A-1E, example 100 includes a verification system, a client device, a first user device, and a second user device. These devices are described in more detail in connection with FIGS. 4 and 5.

Figure 1A:
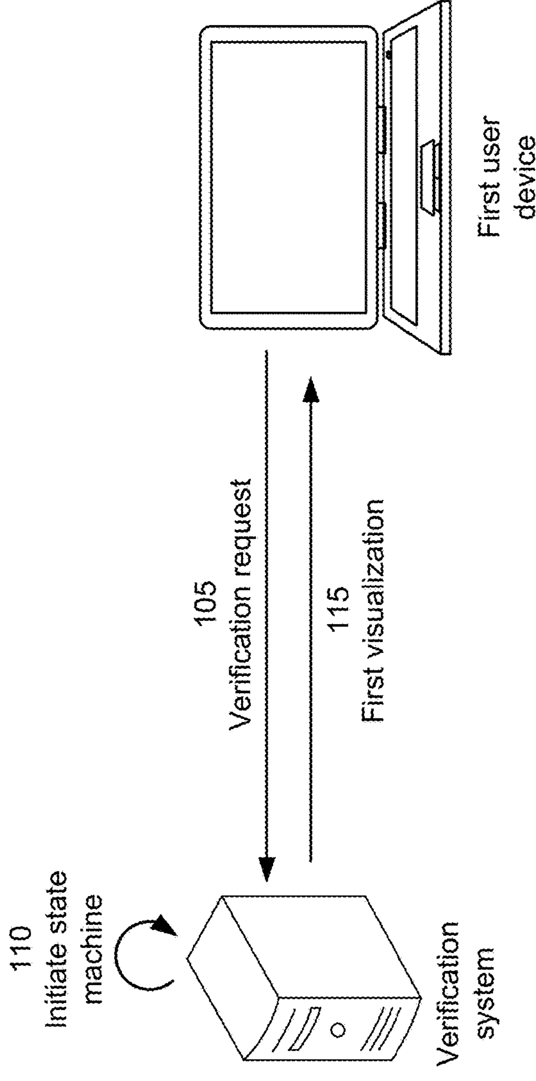
FIGS. 1A-1E are diagrams of an example implementation relating to user verification with state machines, in accordance with some embodiments of the present disclosure.

As shown in FIG. 1A and by reference number 105, the first user device may transmit, and the verification system may receive, a request to initiate verification. In some implementations, a user may input a command to the first user device that triggers transmission of the request. For example, the user, via the first user device, may access a website (e.g., via a uniform resource locator (URL)) hosted by, or at least associated with, the verification system. The user may therefore input the command by interacting with the website. For example, the user may request creation of an account, associated with the user, on the website, which triggers the request to initiate verification. In some implementations, the user, via the first user device, may access a website hosted by, or at least associated with, a third party that subscribes to a verification service provided by the verification system. For example, the user may request creation of an account, associated with the user, on the third party's website, which triggers the request to initiate verification (e.g., via a redirect to the verification system from the third party's website).

As shown by reference number 110, the verification system may initiate a state machine associated with a verification for the user. The state machine may be associated with a plurality of verification procedures for the user. Accordingly, the state machine may be associated with an overall state, and the overall state may be based on a set of states, where each state in the set is associated with a corresponding verification procedure of the plurality of verification procedures. To initiate the state machine, the verification system may set a state associated with an initial verification procedure, of the plurality of verification procedures, to active. Subsequent verification procedures, of the plurality of verification procedures, may also be associated with states set to active when the subsequent verification procedures are required. Additionally, or alternatively, subsequent verification procedures, of the plurality of verification procedures, may be associated with states set to pending (or to inactive) when the subsequent verification procedures are optional (e.g., conditional upon an outcome of the initial verification procedures or a preceding verification procedure).

In some implementations, some of the verification procedures may be performed on the first user device (e.g., text-based verification procedures, as described in connection with FIGS. 3A-3F) and others of the verification procedures may be performed on the second user device (e.g., image-based verification procedures, as described in connection with FIGS. 3A-3F).

As shown by reference number 115, the verification system may generate and transmit, and the first user device may receive and process, instructions for a first visualization associated with a verification procedure performed on the first user device. For example, as described in connection with FIG. 3A, the first visualization may allow for inputting text information associated with the user. Accordingly, the verification procedure performed on the first user device may be associated with text associated with, and entered by, the user.

Figure 1B:
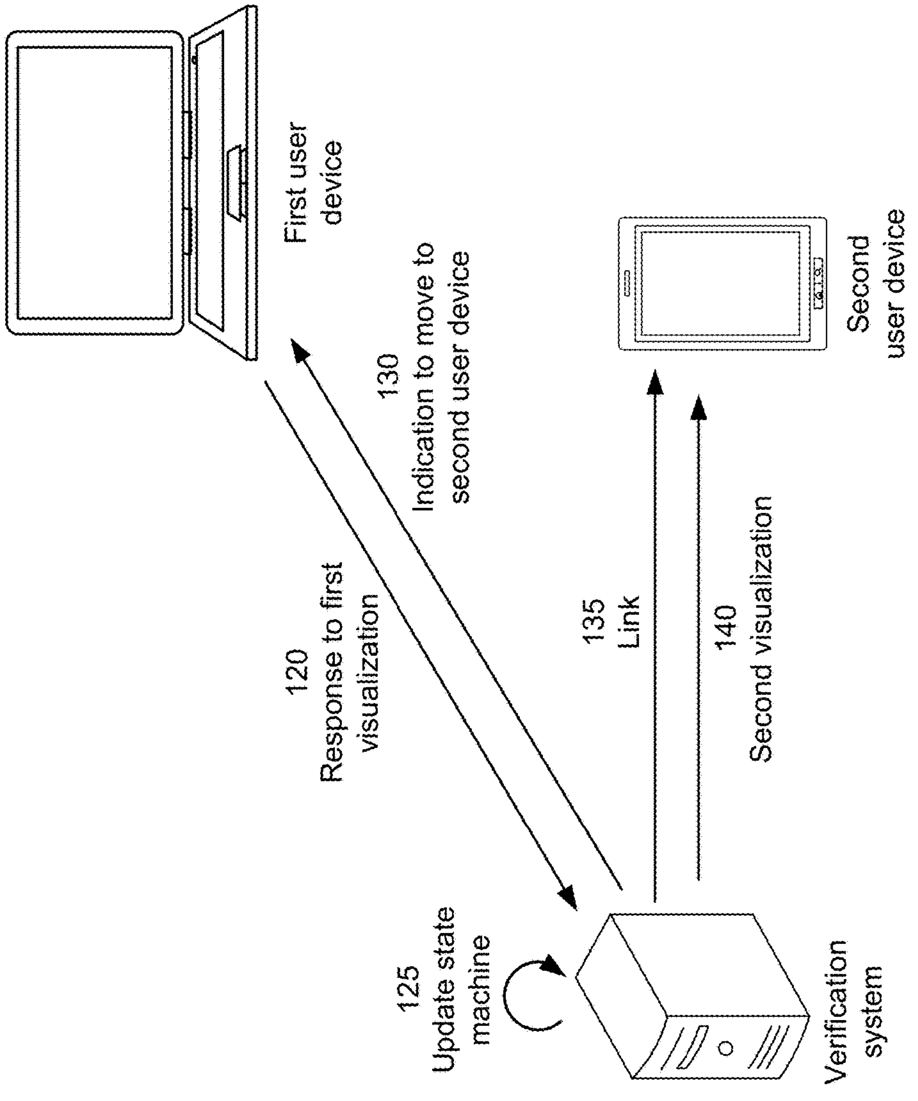

As shown in FIG. 1B and by reference number 120, the first user device may transmit, and the verification system may receive, a response to the first visualization (e.g., based on the user interacting with the first visualization). For example, the user may enter information into input elements of the first visualization such that the information is transmitted to the verification system by the first user device. Accordingly, the verification system may perform text-based verification procedures (e.g., one or more text-based verification procedures). For example, the text-based verification procedures may be associated with verification of a location of residence (e.g., against a whitelist and/or a blacklist of locations), a name (e.g., against a ban list, such as a sanction list), or a telephone number (e.g., using a two-factor procedure), among other examples.

As shown by reference number 125, the verification system may modify a state of the state machine. For example, the verification system may modify the overall state of the state machine by modifying states (e.g., one or more states) associated with the text-based verification procedures. The verification system may change the states associated with the text-based verification procedures to pass or fail based on outcomes of the text-based verification procedures.

In some implementations, the verification system may modify a state associated with a subsequent procedure, of the plurality of verification procedures, based on an outcome associated with a preceding procedure of the plurality verification procedures. For example, when the preceding procedure (e.g., one of the text-based verification procedures) is changed to a fail state, the state of the subsequent procedure (e.g., an image-based verification procedure) may be changed from inactive to active. Accordingly, the subsequent procedure may be a backup procedure that is only activated when the preceding procedure fails. In another example, when the preceding procedure (e.g., one of the text-based verification procedures) is changed to a pass state, the state of the subsequent procedure (e.g., an image-based verification procedure) may be changed to deactivated. Accordingly, the subsequent procedure may be a backup procedure that is not used when the preceding procedure passes. In another example, when the preceding procedure (e.g., one of the text-based verification procedures) is changed to a pass state, the state of the subsequent procedure (e.g., an image-based verification procedure) may be changed from active to pending. Accordingly, the subsequent procedure may be required after the preceding procedure completes (whether a pass or a fail).

As shown by reference number 130, the verification system may generate and transmit, and the first user device may receive and process, instructions for a visualization that instructs the user to use the second user device. For example, the visualization may be as described in connection with FIG. 3B and/or FIG. 3C.

Additionally, as shown by reference number 135, the verification system may generate and transmit, and the second user device may receive, a link. In some implementations, the verification system may transmit the link (e.g., a URL) via text message, email message, and/or another type of communication message. Alternatively, and as described in connection with FIG. 3B, the verification system may generate a visual code (e.g., a quick response (QR) code) and transmit the visual code for display on the first user device, such that the second user device receives the link by decoding the visual code (e.g., using an optical sensor pointed toward the first user device).

In some implementations, the verification system may detect that the first user device does not include an optical sensor (or does not include an optical sensor at least partially integrated, whether physically, logically, and/or virtually, with the first user device), and thus the verification system may determine to direct the user to the second user device. For example, the verification system may receive, from the first user device, a compatibility message indicating that the first user device does not include an optical sensor. In another example, the verification system may receive a model number or another indication associated with the first user device such that the verification system uses the indication to determine that the first user device does not include an optical sensor (e.g., using a look-up table or another similar type of data structure). Accordingly, the link may be used to redirect the user to the second user device, which includes an optical sensor that may be at least partially integrated with the second user device.

Additionally, as shown by reference number 140, the verification system may generate and transmit, and the second user device may receive and process, instructions for a second visualization associated with a verification procedure performed on the second user device. For example, as described in connection with FIG. 3D, the second visualization may allow for capture of an image (e.g., one or more images) or a video of the user and/or a document (e.g., at least one document) associated with the user. Accordingly, the verification procedure performed on the second user device may be associated with the image or the video of the user and/or the document.

Figure 1C:
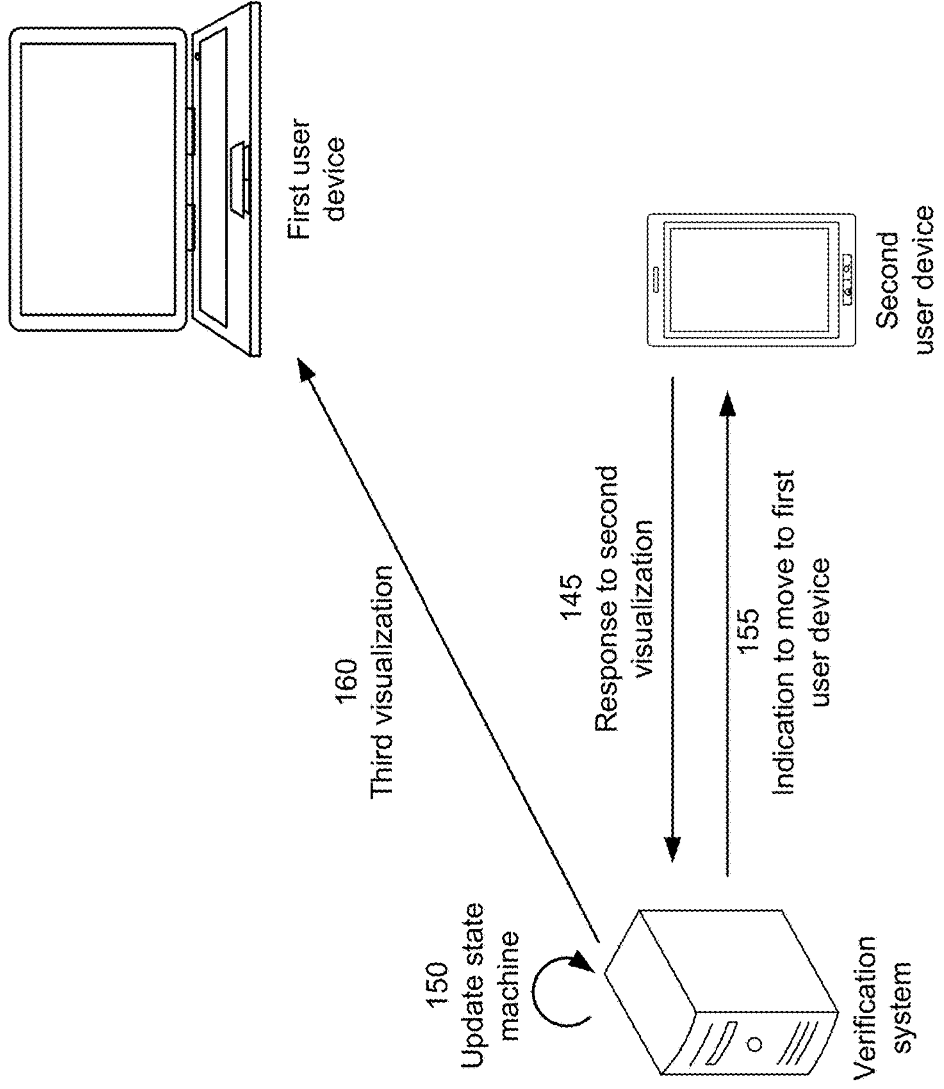

As shown in FIG. 1C and by reference number 145, the second user device may transmit, and the verification system may receive, a response to the second visualization (e.g., based on the user interacting with the second visualization). For example, the user may upload a captured image (and/or a captured video) to the verification system using the second visualization. Accordingly, the verification system may perform image-based verification procedures (e.g., one or more image-based verification procedures). For example, the image-based verification procedures may be associated with verification of a selfie of the user (e.g., using a plurality of facial features extracted using a neural network or another type of machine learning model) and/or a video of the user (e.g., using a plurality of features, extracted using a neural network or another type of machine learning model, that detect a heartbeat and/or another indicum of liveness), an image of the document (e.g., using a plurality of features extracted using a neural network or another type of machine learning model) and/or a video of the document (e.g., using a plurality of features, extracted using a neural network or another type of machine learning model, that detect a paper sheen and/or another indicum of liveness), among other examples.

As shown by reference number 150, the verification system may modify a state of the state machine. For example, the verification system may modify the overall state of the state machine by modifying states (e.g., one or more states) associated with the image-based verification procedures. The verification system may change the states associated with the image-based verification procedures to pass or fail based on outcomes of the image-based verification procedures.

In some implementations, the verification system may modify a state associated with a subsequent procedure, of the plurality of verification procedures, based on an outcome associated with a preceding procedure of the plurality verification procedures. For example, when the preceding procedure (e.g., one of the image-based verification procedures) is changed to a fail state, the state of the subsequent procedure (e.g., an additional text-based verification procedure or image-based verification procedure) may be changed from inactive to active. Accordingly, the subsequent procedure may be a backup procedure that is only activated when the preceding procedure fails. In another example, when the preceding procedure (e.g., one of the image-based verification procedures) is changed to a pass state, the state of the subsequent procedure (e.g., an additional text-based verification procedure or image-based verification procedure) may be changed to deactivated. Accordingly, the subsequent procedure may be a backup procedure that is not used when the preceding procedure passes. In another example, when the preceding procedure (e.g., one of the image-based verification procedures) is changed to a pass state, the state of the subsequent procedure (e.g., an additional text-based verification procedure or image-based verification procedure) may be changed from active to pending. Accordingly, the subsequent procedure may be required after the preceding procedure completes (whether a pass or a fail).

As shown by reference number 155, the verification system may generate and transmit, and the second user device may receive and process, instructions for a visualization that instructs the user to return to the first user device. For example, the visualization may be as described in connection with FIG. 3E.

Although the example 100 is described in connection with two user devices, other examples may include the user performing verification procedures using a single user device. For example, the user may perform verification procedures solely on a laptop device or a smartphone.

Additionally, as shown by reference number 160, the verification system may generate and transmit, and the first user device may receive and process, instructions for a third visualization associated with a verification procedure performed on the first user device. For example, the third visualization may allow for inputting text information associated with the user. Accordingly, the verification procedure performed on the first user device may be associated with text associated with, and entered by, the user.

Figure 1D:
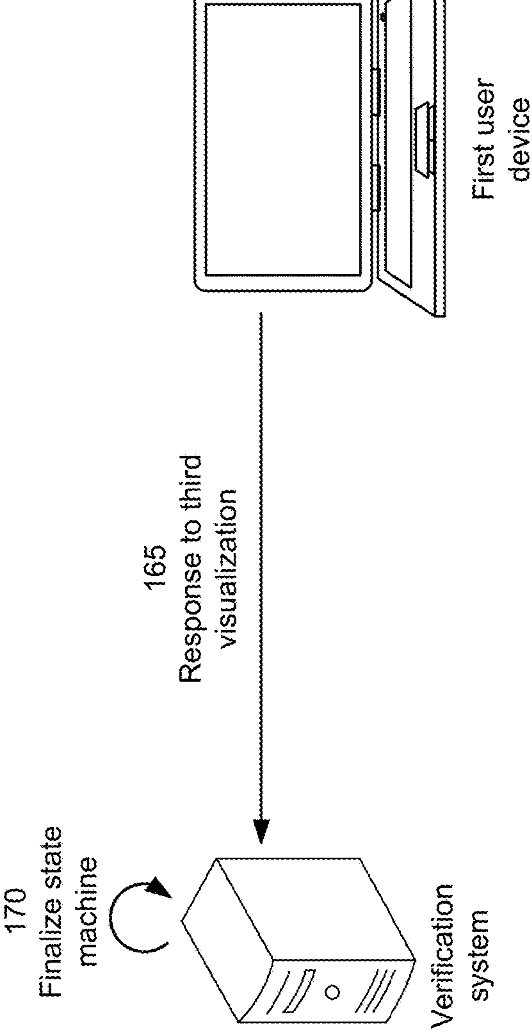

As shown in FIG. 1D and by reference number 165, the first user device may transmit, and the verification system may receive, a response to the third visualization (e.g., based on the user interacting with the second visualization). For example, the user may enter information into input elements of the third visualization such that the information is transmitted to the verification system by the first user device. Accordingly, the verification system may perform text-based verification procedures (e.g., one or more text-based verification procedures). For example, the text-based verification procedures may be associated with verification of an address (e.g., by checking public records associated with the user) or a national identity (ID) number (e.g., by checking public records associated with the user), among other examples.

As shown by reference number 170, the verification system may determine a final state of the state machine. For example, the verification system may modify the overall state of the state machine by modifying states (e.g., one or more states) associated with the text-based verification procedures. The verification system may determine the final state (e.g., both the overall state and the set of states associated with the plurality of verification procedures) based on an outcome associated with the subsequent procedure of the verification procedures.

As described above, the preceding procedure of the plurality of verification procedures may be associated with a verification of public information associated with the user, and the subsequent procedure of the plurality of verification procedures may be associated with a verification of an image and/or a video of the user and/or a document associated with the user, as described above. Additionally, or alternatively, the subsequent procedure may include video analysis of a selfie video representing the user for at least one second, as described above. For example, the subsequent procedure may include computer vision analysis of the video in order to validate that the video is live and represents the user. Although described in connection with three verification procedures, the state machine may be similarly used for a sequence of fewer verification procedures (e.g., two verification procedures) or a sequence of additional verification procedures (e.g., four verification procedures, five verification procedures, and so on). By using the state machine, the verification system prevents the user from skipping any required verification procedures (and/or any backup verification procedures necessitated by a failed preceding verification procedure). In particular, the state machine transitions are rule-based such that the user may not place the state machine in an overall state that is barred (which would happen if the user managed to skip a required verification procedure and/or a backup verification procedure necessitated by a failed preceding verification procedure).

Figure 1E:
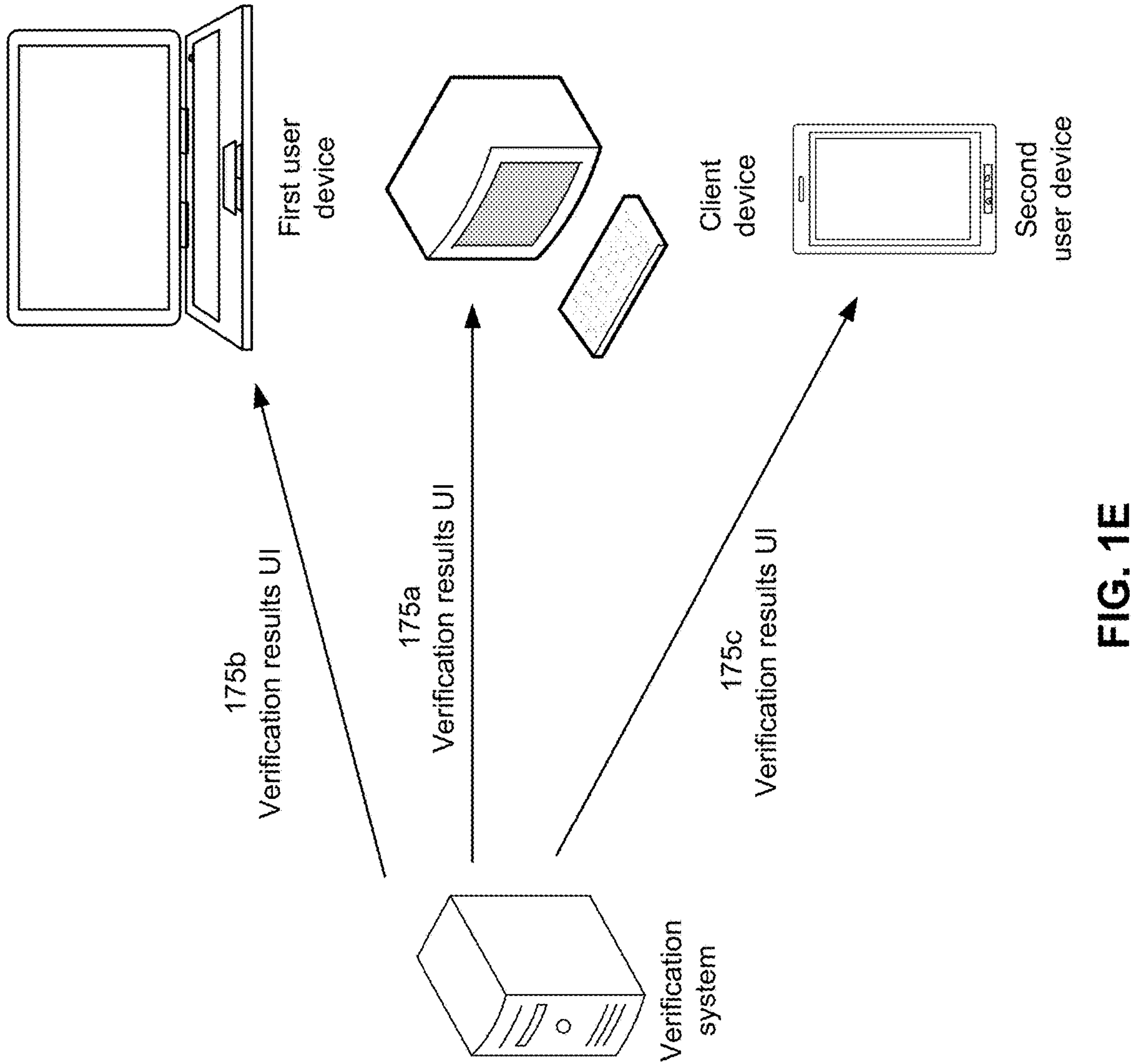

As shown in FIG. 1E and by reference number 175*a*, the verification system may transmit, and the client device may receive, an indication of the outcome associated with the preceding procedure and the outcome associated with the subsequent procedure (as well as any additional verification procedures in the plurality of verification procedures). The client device may be associated with the third party subscribing to the verification service provided by the verification system, as described above. In some implementations, the indication may include a user interface (UI) displaying outcomes (e.g., states of the state machine) associated with the plurality of verification procedures. The UI may further display an overall outcome (e.g., an overall state of the state machine). Accordingly, the client device may determine whether to initiate a repeat of at least a portion of the plurality of verification procedures, as described in connection with FIGS. 2A-2C.

Additionally, as shown by reference numbers 175*b* and 175*c*, the verification system may transmit, and the first user device and/or the second user device may receive, respectively, an indication of an overall outcome associated with the plurality of verification procedures. In some implementations, the indication may include a UI displaying the overall outcome (e.g., an overall state of the state machine).

By using techniques as described in connection with FIGS. 1A-1E, the verification system uses the state machine to manage an order of the plurality of verification procedures. The state machine prevents the user from circumventing KYC requirements by preventing the user from moving to unauthorized states. Accordingly, the verification system conserves memory space, power, and processing resources as compared with compiling, debugging, and executing robust exception coding to prevent the user from circumventing KYC requirements.

As indicated above, FIGS. 1A-1E are provided as an example. Other examples may differ from what is described with regard to FIGS. 1A-1E.

Figure 2A:
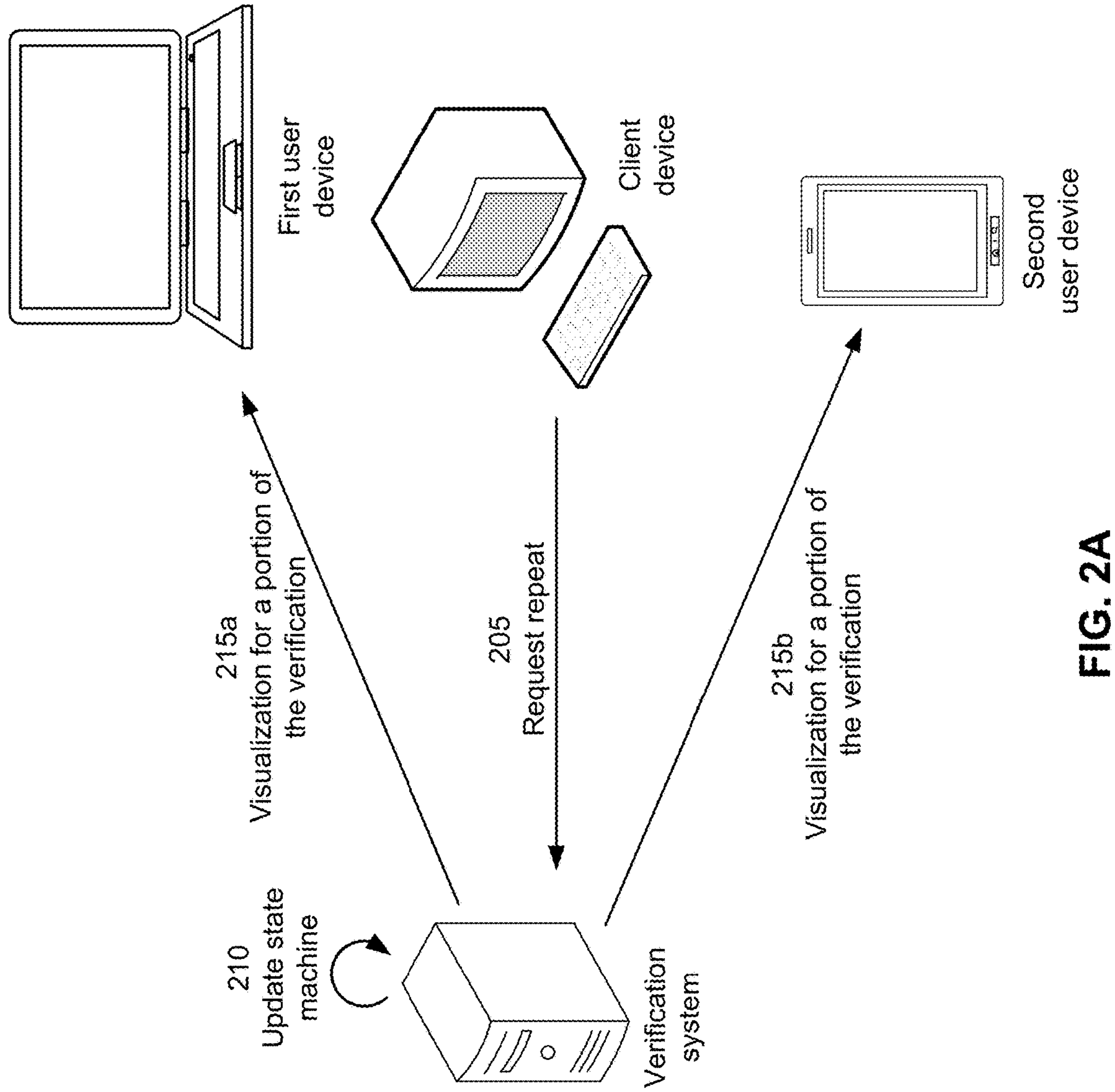
FIGS. 2A-2C are diagrams of an example implementation relating to resuming user verification with state machines, in accordance with some embodiments of the present disclosure.
Figure 2B:
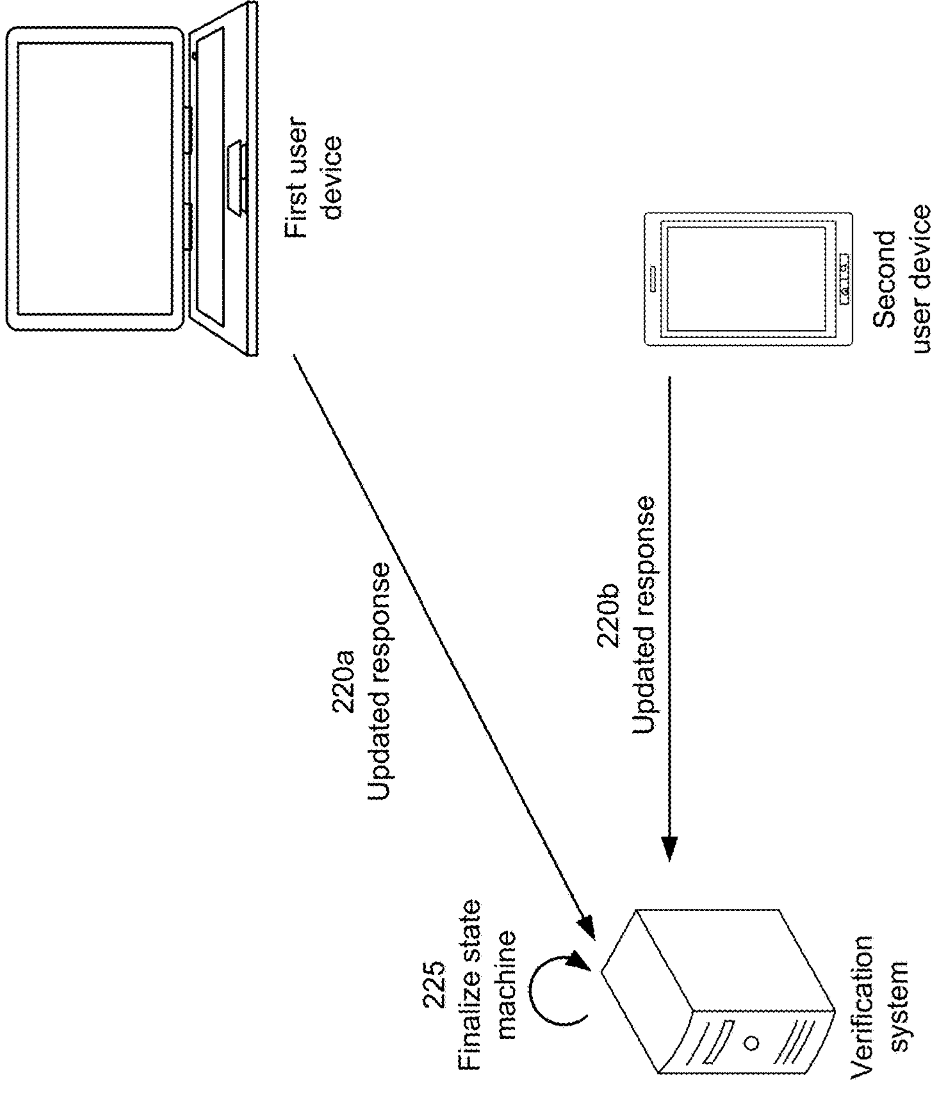
Figure 2C:
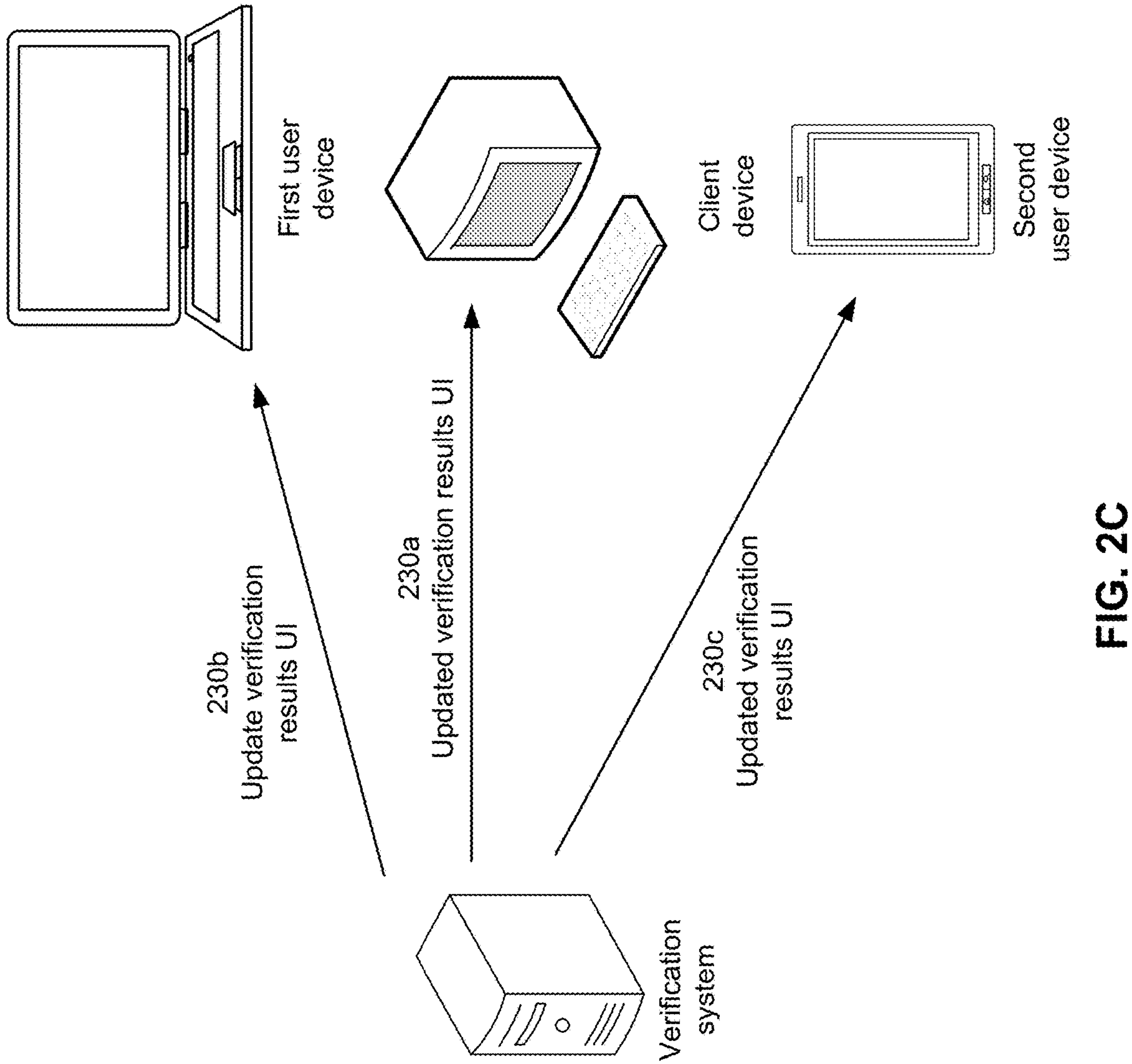

FIGS. 2A-2C are diagrams of an example 200 associated with resuming user verification with state machines. As shown in FIGS. 2A-2C, example 200 includes a verification system, a client device, a first user device, and a second user device. These devices are described in more detail in connection with FIGS. 4 and 5.

In example 200, a user may already have undergone a plurality of verification procedures in which a verification procedure (e.g., at least one verification procedure) has failed. For example, the verification system (along with the first and second user devices) may have performed the plurality of verification procedures as described in connection with FIGS. 1A-1E. Accordingly, the verification system may have stored (e.g., in memory) a state machine in a final state associated with the plurality of verification procedures. Additionally, the verification system may transmit, and the client device may receive, an indication of which verification procedures, of the plurality of verification procedures, are associated with failure.

Accordingly, as shown in FIG. 2A and by reference number 205, the client device may transmit, and the verification system may receive, a request to repeat verification associated with the user. For example, an administrator may input a command to the client device that triggers transmission of the request. The administrator may interact with a UI that indicates the failure (e.g., as described in connection with FIG. 1E) such that the command is based on the interaction. The verification system may provide a new URL to the user (via the first user device and/or the second user device) and/or may transmit a modification to an existing website (e.g., associated with a login webpage) to trigger when the user (via the first user device and/or the second user device) returns to the website (e.g., hosted by, or at least associated with, the verification system or a third part, as described in connection with FIG. 1A).

As shown by reference number 210, the verification system may re-modify the state of the state machine. For example, the verification system may modify the overall state of the state machine by modifying a state (e.g., one or more states) associated with the failed verification procedure. The verification system may change the state associated with the failed verification procedure from fail to active.

In some implementations, the state machine may be associated with a rule that prevents modifying a failed state to an active state, for the failed verification procedure, unless the state of the state machine associated with a subsequent procedure, of the plurality of verification procedures, is in an active state. The user may therefore have to re-do both the subsequent verification procedure as well as the failed verification procedure in order to comply with KYC requirements. For example, the subsequent verification procedure may be associated with a sanctions check, and the failed verification procedure may be associated with a name check against public records. Accordingly, the rule ensures that the user cannot bypass the subsequent verification procedure.

Additionally, or alternatively, the state machine may be associated with a rule that prevents modifying an active state to an inactive state. Accordingly, once the verification system activates a verification procedure, that verification procedure cannot be skipped by the user. Accordingly, the rule ensures that the user cannot inadvertently or maliciously deactivate verification procedures that are required.

As shown by reference number 215*a*, the verification system may generate and transmit, and the first user device may receive and process, instructions for a visualization associated with the failed verification procedure repeated on the first user device. For example, as described in connection with FIG. 3A, the visualization may allow for inputting text information associated with the user. Accordingly, the failed verification procedure repeated on the first user device may be associated with text associated with, and entered by, the user.

Additionally, or alternatively, as shown by reference number 215*b*, the verification system may generate and transmit, and the second user device may receive and process, instructions for a visualization associated with the failed verification procedure repeated on the second user device. For example, as described in connection with FIG. 3D, the visualization may allow for capture of an image (e.g., one or more images) or a video of the user and/or a document (e.g., at least one document) associated with the user. Accordingly, the failed verification procedure repeated on the second user device may be associated with the image or the video of the user and/or the document.

As shown in FIG. 2B and by reference number 220*a*, the first user device may transmit, and the verification system may receive, a response to the visualization (e.g., based on the user interacting with the visualization). For example, the user may enter information into input elements of the visualization such that the information is transmitted to the verification system by the first user device. Accordingly, the verification system may repeat the failed verification procedure (e.g., one or more text-based verification procedures, as described herein).

Additionally, or alternatively, as shown by reference number 220*b*, the second user device may transmit, and the verification system may receive, a response to the visualization (e.g., based on the user interacting with the visualization). For example, the user may upload a captured image (and/or a captured video) to the verification system using the visualization. Accordingly, the verification system may repeat the failed verification procedure (e.g., one or more image-based verification procedures, as described herein).

The verification system may further refrain from performing a repetition of remaining verification procedures (e.g., at least one remaining verification procedure) of the plurality of verification procedures. For example, the verification system may have re-modified the state of the state machine (e.g., as described in connection with reference number 210) such that the remaining verifications procedures are still associated with pass states. Accordingly, the verification system may refrain from redoing the remaining verifications procedures altogether. Alternatively, the verification system may repeat the remaining verification procedures but using input previously received from the user (e.g., as described in connection with FIGS. 1A-1E). As a result, the verification system conserves power, processing resources, and network resources that would otherwise have been expended in receiving new input from the user to repeat the remaining verification procedures.

As shown by reference number 225, the verification system may re-determine a final state of the state machine. For example, the verification system may modify the overall state of the state machine by modifying states (e.g., one or more states) associated with the repetition (e.g., one or more repetitions) of the failed verification procedure. The verification system may determine the final state (e.g., both the overall state and the set of states associated with the plurality of verification procedures) based on an outcome associated with the repetition of the failed verification procedure.

As shown in FIG. 2C and by reference number 230*a*, the verification system may transmit, and the client device may receive, an indication of the outcome associated with the repetition of the failed verification procedure (as well as any remaining verification procedures in the plurality of verification procedures). The client device may be associated with the third party subscribing to the verification service provided by the verification system, as described herein. In some implementations, the indication may include a UI displaying outcomes (e.g., states of the state machine) associated with the plurality of verification procedures. The UI may further display an overall outcome (e.g., an overall state of the state machine).

Additionally, as shown by reference numbers 230*b* and 230*c*, the verification system may transmit, and the first user device and/or the second user device may receive an indication of an overall outcome associated with the plurality of verification procedures. In some implementations, the indication may include a UI displaying the overall outcome (e.g., an overall state of the state machine).

Although the example 200 is described in connection with two user devices, other examples may include the user performing verification procedures using a single user device. For example, the user may perform verification procedures solely on a laptop device or a smartphone.

By using techniques as described in connection with FIGS. 2A-2C, the verification system uses the state machine to repeat only a portion of the plurality of verification procedures. The state machine prevents a user from circumventing KYC requirements (e.g., by preventing the user from moving to unauthorized states) when the user repeats the failed verification procedures (e.g., using the rules described above). The state machine still allows for reuse of successful verification procedures without additional input from the user. Accordingly, the verification system conserves power, processing resources, and network resources as compared with repeating the all verification procedures (in the plurality of verification procedures).

As indicated above, FIGS. 2A-2C are provided as an example. Other examples may differ from what is described with regard to FIGS. 2A-2C.

FIGS. 3A, 3B, 3C, 3D, 3E, and 3F are diagrams of example UIs 300, 310, 320, 330, 340, and 350, respectively, associated with user verification. Example UIs 300, 310, 320, 330, 340, and 350 may be displayed on a first user device or a second user device, which are described in more detail in connection with FIGS. 4 and 5. For example, the first user device may include a desktop computer or a laptop computer, and the second user device may include a smartphone.

Example UI 300 may be associated with a verification performed on a first user device. For example, the verification performed on the first user device is associated with text associated with and entered by a user. Accordingly, example UI 300 may be used to obtain information for text-based verification procedures.

Figure 3A:
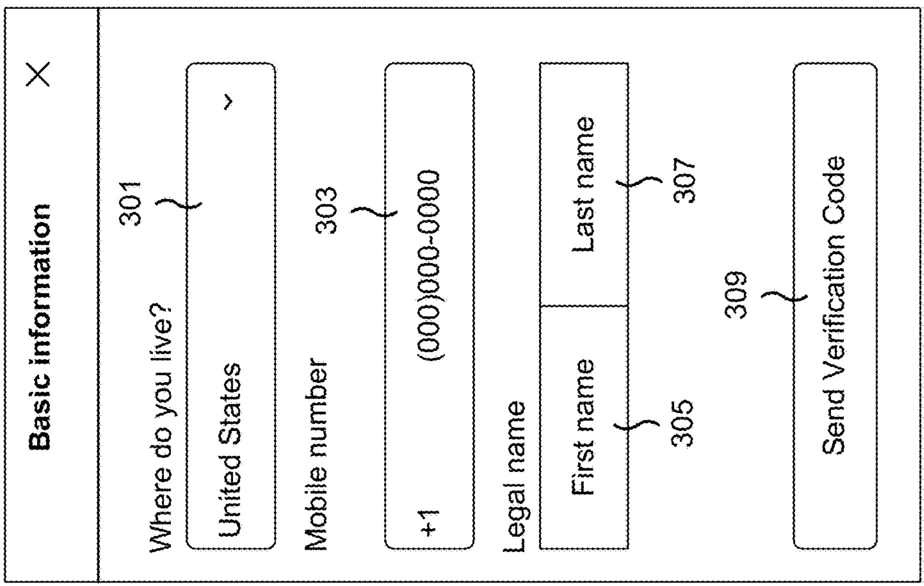
FIGS. 3A-3F are diagrams of example user interfaces associated with user verification, in accordance with some embodiments of the present disclosure.

As shown in FIG. 3A, example UI 300 may include input elements (e.g., one or more input elements) configured to receive information associated with the user. Example UI 300 includes a drop-down menu 301 configured to receive a country associated with the user, a text box 303 configured to receive a telephone number, a text box 305 configured to receive a given name associated with the user, and a text box 307 configured to receive a surname associated with the user. Other implementations may include different input elements, fewer input elements (e.g., three input elements, two input elements, or one input element), or additional input elements (e.g., five input elements, six input elements, and so on).

Furthermore, as shown in FIG. 3A, example UI 300 may include a confirmation element (e.g., button 309) configured to trigger the text-based verification procedures. For example, the button 309 may trigger verification of the country, the telephone number, the given name, and the surname. In some implementations, the confirmation element may trigger an additional verification procedure. For example, the button 309 may trigger transmission of an alphanumeric code to the telephone number in the text box 303 (e.g., a short message service (SMS) text message) and prompt the user (via the first user device) to enter the alphanumeric code.

Example UI 310 may include an instruction 311 to use the second user device. For example, the verification performed on the second user device may be associated with at least one image of a user and/or at least one image of a document associated with the user. In some implementations, a verification system may detect that the first user device does not include an optical sensor (or does not include an optical sensor at least partially integrated with the first user device) and thus determine to use example UI 310. Accordingly, example UI 310 may be used to redirect the user to the second user device (which includes an optical sensor that may be at least partially integrated with the second user device).

Figure 3B:
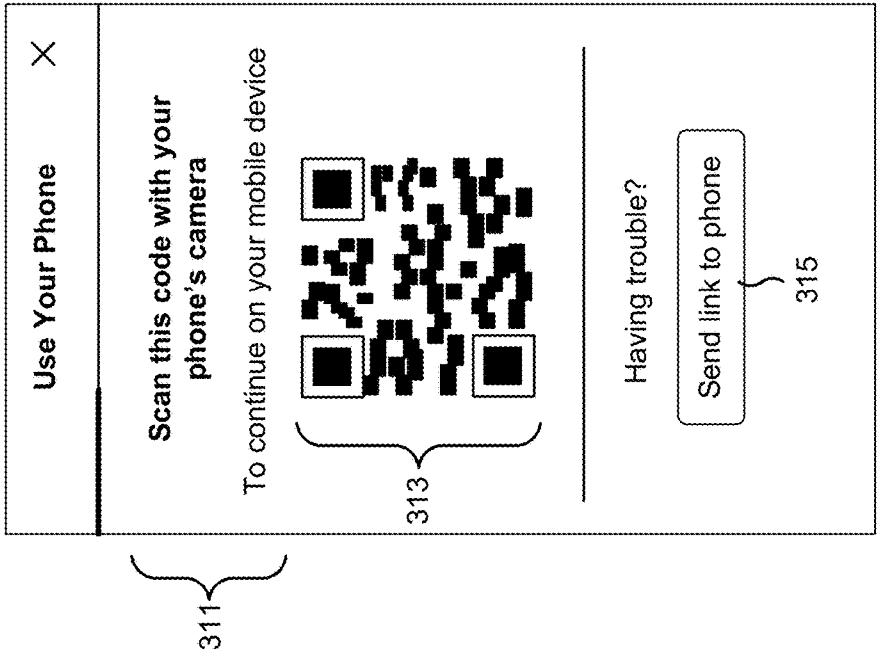
Figure 3C:
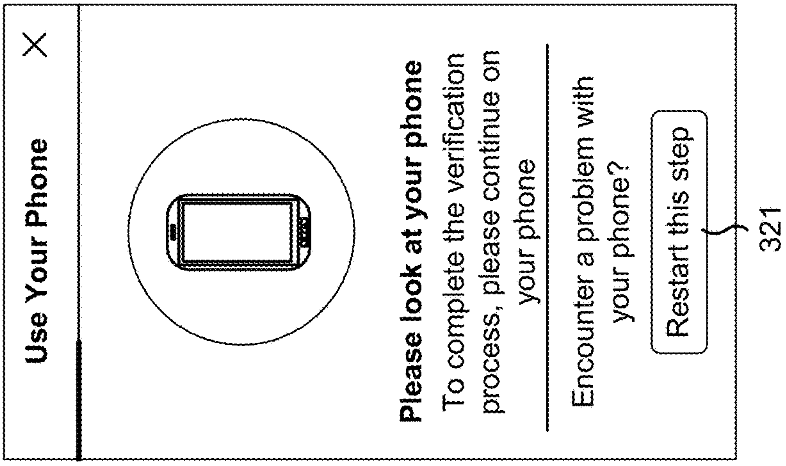

As shown in FIG. 3B, example UI 310 may include a QR code 313 and/or another type of visual code used to communicate a link (e.g., a URL) to the second user device. For example, the second user device may scan the visual code using the optical sensor of the second user device to continue a verification of the user. Additionally, or alternatively, example UI 310 may include the link or may include an element (e.g., button 315) to trigger transmission of the link to the second user device (e.g., using the telephone number obtained using example UI 300).

Example UI 320 may include an interstitial visualization associated with a status of the verification performed on the second user device. Accordingly, example UI 320 may be used to indicate that the user should continue using the second user device. In some implementations, example UI 320 may update to include new status information as the user proceeds with image-based verification procedures on the second user device. In some implementations, example UI 320 may include an element (e.g., button 321) to trigger retransmission of the link to the second user device (e.g., using the telephone number obtained using example UI 300) and/or re-display of example UI 310 (with the QR code 313 and/or the link) again. Accordingly, the user may restart the image-based verification procedures on the second user device using the button 321 on the first user device.

Example UI 330 may be associated with a verification performed on the second user device. Example UI 330 may be used to obtain information for image-based verification procedures.

Figure 3D:
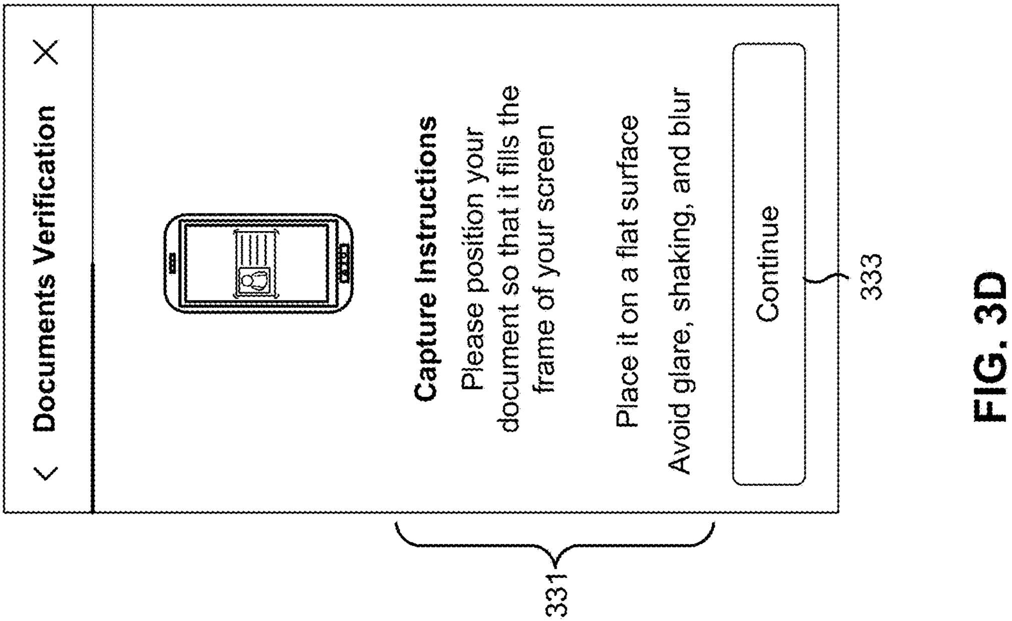

As shown in FIG. 3D, example UI 330 may include an instruction 331 for capturing an image or a video representing the user or a document associated with the user. Furthermore, as shown in FIG. 3D, example UI 330 may include a confirmation element (e.g., button 333) configured to trigger the image-based verification procedures. For example, the button 333 may trigger verification of an image captured by the second user device (e.g., selfie verification and/or document verification, as described herein). In some implementations, the confirmation element may also trigger an additional instruction for capturing an additional image or an additional video. For example, the button 333 may trigger instructions to capture a selfie after an image associated with a document has been captured.

Figure 3E:
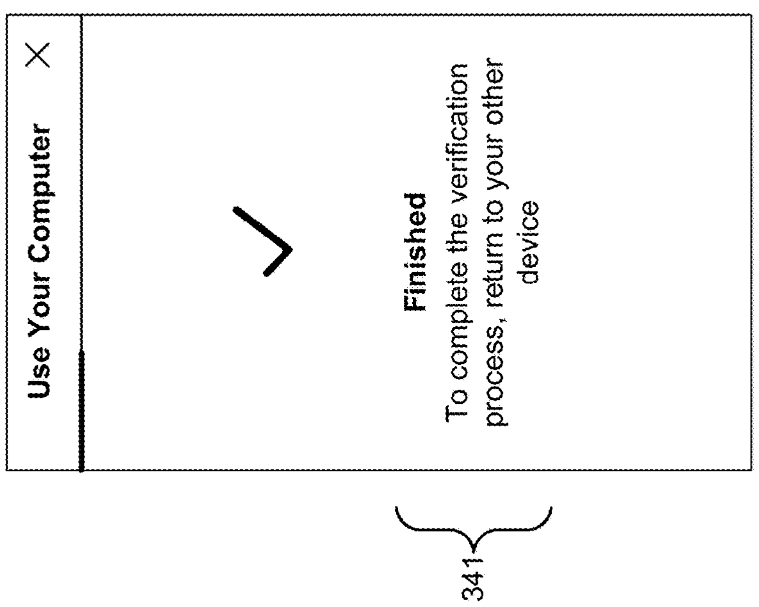

As shown in FIG. 3E, example UI 340 may include an instruction 341 to return to the first user device. In some implementations, the verification system may complete the image-based verification procedures such that the second user device is no longer needed. Accordingly, example UI 340 may be used to redirect the user back to the first user device.

Figure 3F:
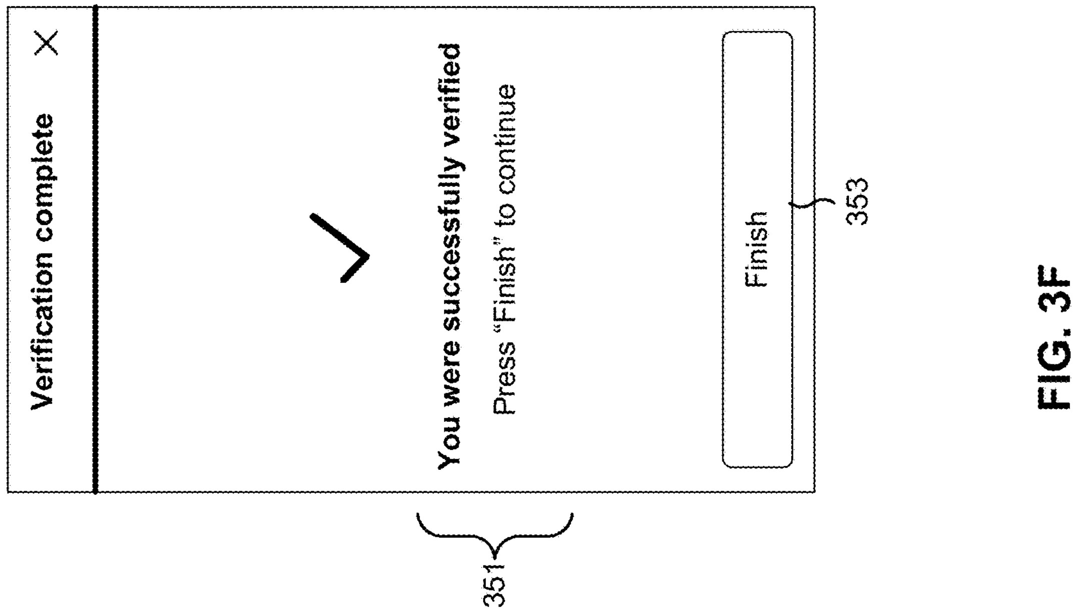

As shown in FIG. 3F, example UI 350 may indicate a status 351 of the text-based verification procedures. Additionally, or alternatively, example UI 350 may include input elements (e.g., one or more input elements) configured to receive additional information associated with the user.

Furthermore, as shown in FIG. 3F, example UI 350 may include a confirmation element (e.g., button 353) configured to finalize verification of the user. For example, the button 353 may trigger creation of an account associated with the user.

By using visualizations as described in connection with FIGS. 3A-3F, the verification system may seamlessly transition the user between user devices to perform text-based verification procedures in combination with image-based verification procedures. By using UIs to move the user between user devices, the verification system conserves power and processing resources as compared with the user re-navigating and re-entering credentials whenever moving between devices.

As indicated above, FIGS. 3A-3F are provided as examples. Other examples may differ from what is described with regard to FIGS. 3A-3F.

Figure 4:
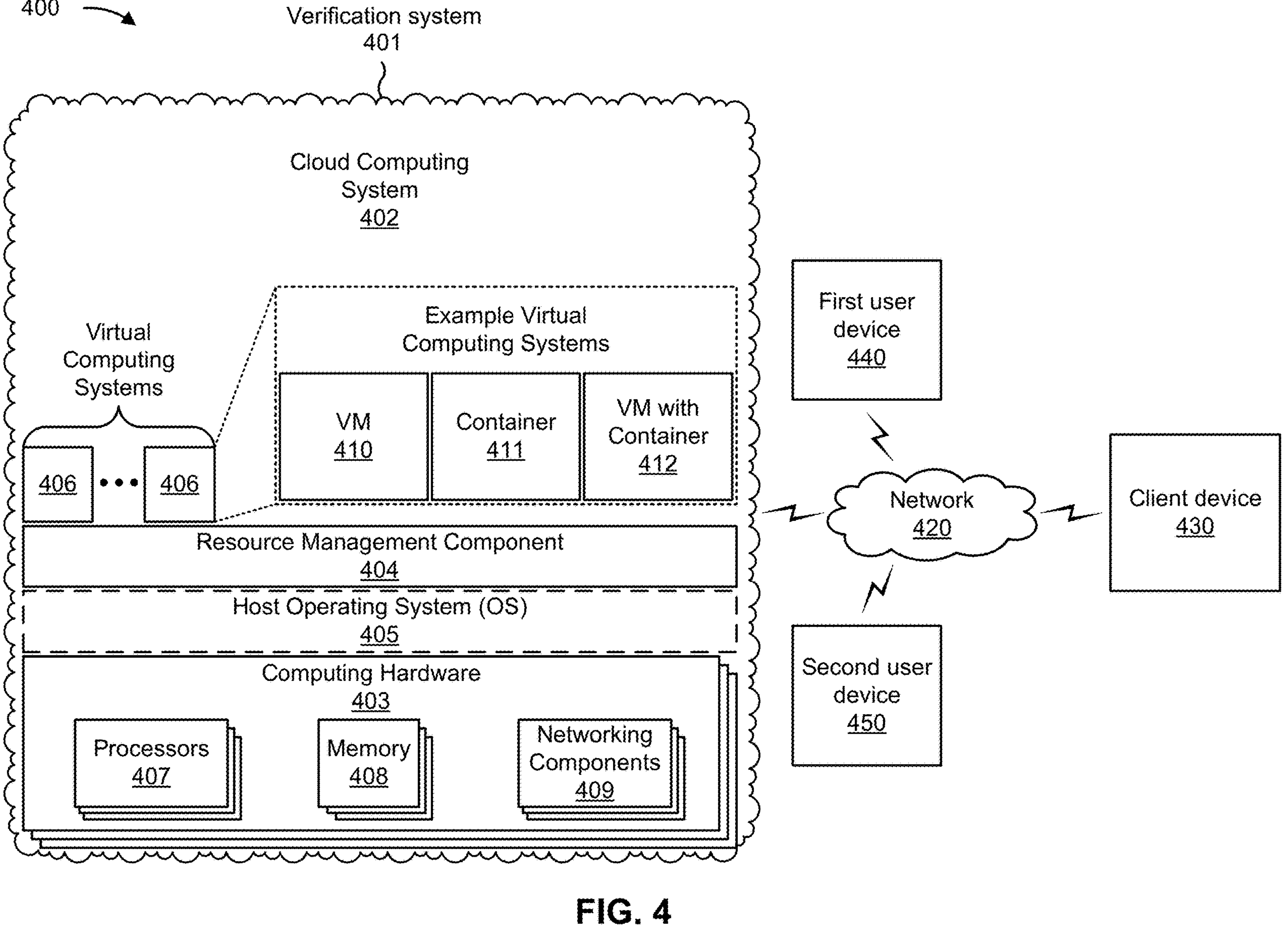
FIG. 4 is a diagram of an example environment in which systems and/or methods described herein may be implemented, in accordance with some embodiments of the present disclosure.

FIG. 4 is a diagram of an example environment 400 in which systems and/or methods described herein may be implemented. As shown in FIG. 4, environment 400 may include a verification system 401, which may include one or more elements of and/or may execute within a cloud computing system 402. The cloud computing system 402 may include one or more elements 403-412, as described in more detail below. As further shown in FIG. 4, environment 400 may include a network 420, a client device 430, a first user device 440, and/or a second user device 450. Devices and/or elements of environment 400 may interconnect via wired connections and/or wireless connections.

The cloud computing system 402 may include computing hardware 403, a resource management component 404, a host operating system (OS) 405, and/or one or more virtual computing systems 406. The cloud computing system 402 may execute on, for example, an Amazon Web Services platform, a Microsoft Azure platform, or a Snowflake platform. The resource management component 404 may perform virtualization (e.g., abstraction) of computing hardware 403 to create the one or more virtual computing systems 406. Using virtualization, the resource management component 404 enables a single computing device (e.g., a computer or a server) to operate like multiple computing devices, such as by creating multiple isolated virtual computing systems 406 from computing hardware 403 of the single computing device. In this way, computing hardware 403 can operate more efficiently, with lower power consumption, higher reliability, higher availability, higher utilization, greater flexibility, and lower cost than using separate computing devices.

The computing hardware 403 may include hardware and corresponding resources from one or more computing devices. For example, computing hardware 403 may include hardware from a single computing device (e.g., a single server) or from multiple computing devices (e.g., multiple servers), such as multiple computing devices in one or more data centers. As shown, computing hardware 403 may include one or more processors 407, one or more memories 408, and/or one or more networking components 409. Examples of a processor, a memory, and a networking component (e.g., a communication component) are described elsewhere herein.

The resource management component 404 may include a virtualization application (e.g., executing on hardware, such as computing hardware 403) capable of virtualizing computing hardware 403 to start, stop, and/or manage one or more virtual computing systems 406. For example, the resource management component 404 may include a hypervisor (e.g., a bare-metal or Type 1 hypervisor, a hosted or Type 2 hypervisor, or another type of hypervisor) or a virtual machine monitor, such as when the virtual computing systems 406 are virtual machines 410. Additionally, or alternatively, the resource management component 404 may include a container manager, such as when the virtual computing systems 406 are containers 411. In some implementations, the resource management component 404 executes within and/or in coordination with a host operating system 405.

A virtual computing system 406 may include a virtual environment that enables cloud-based execution of operations and/or processes described herein using computing hardware 403. As shown, a virtual computing system 406 may include a virtual machine 410, a container 411, or a hybrid environment 412 that includes a virtual machine and a container, among other examples. A virtual computing system 406 may execute one or more applications using a file system that includes binary files, software libraries, and/or other resources required to execute applications on a guest operating system (e.g., within the virtual computing system 406) or the host operating system 405.

Although the verification system 401 may include one or more elements 403-412 of the cloud computing system 402, may execute within the cloud computing system 402, and/or may be hosted within the cloud computing system 402, in some implementations, the verification system 401 may not be cloud-based (e.g., may be implemented outside of a cloud computing system) or may be partially cloud-based. For example, the verification system 401 may include one or more devices that are not part of the cloud computing system 402, such as device 500 of FIG. 5, which may include a standalone server or another type of computing device. The verification system 401 may perform one or more operations and/or processes described in more detail elsewhere herein.

The network 420 may include one or more wired and/or wireless networks. For example, the network 420 may include a cellular network, a public land mobile network (PLMN), a local area network (LAN), a wide area network (WAN), a private network, the Internet, and/or a combination of these or other types of networks. The network 420 enables communication among the devices of the environment 400.

The client device 430 may include one or more devices capable of receiving, generating, storing, processing, providing, and/or routing information associated with verification procedures, as described elsewhere herein. The client device 430 may include a communication device and/or a computing device. For example, the client device 430 may include a server, such as an application server, a client server, a web server, a database server, a host server, a proxy server, a virtual server (e.g., executing on computing hardware), or a server in a cloud computing system. In some implementations, the client device 430 may include computing hardware used in a cloud computing environment.

The first user device 440 may include one or more devices capable of receiving, generating, storing, processing, and/or providing information associated with user information, as described elsewhere herein. The first user device 440 may include a communication device and/or a computing device. For example, the first user device 440 may include a wireless communication device, a mobile phone, a user equipment, a laptop computer, a tablet computer, a desktop computer, a gaming console, a set-top box, a wearable communication device (e.g., a smart wristwatch, a pair of smart eyeglasses, a head mounted display, or a virtual reality headset), or a similar type of device.

The second user device 450 may include one or more devices capable of receiving, generating, storing, processing, and/or providing information associated with user information, as described elsewhere herein. The second user device 450 may include a communication device and/or a computing device. For example, the second user device 450 may include a wireless communication device, a mobile phone, a user equipment, a laptop computer, a tablet computer, a desktop computer, a gaming console, a set-top box, a wearable communication device (e.g., a smart wristwatch, a pair of smart eyeglasses, a head mounted display, or a virtual reality headset), or a similar type of device.

The number and arrangement of devices and networks shown in FIG. 4 are provided as an example. In practice, there may be additional devices and/or networks, fewer devices and/or networks, different devices and/or networks, or differently arranged devices and/or networks than those shown in FIG. 4. Furthermore, two or more devices shown in FIG. 4 may be implemented within a single device, or a single device shown in FIG. 4 may be implemented as multiple, distributed devices. Additionally, or alternatively, a set of devices (e.g., one or more devices) of the environment 400 may perform one or more functions described as being performed by another set of devices of the environment 400.

Figure 5:
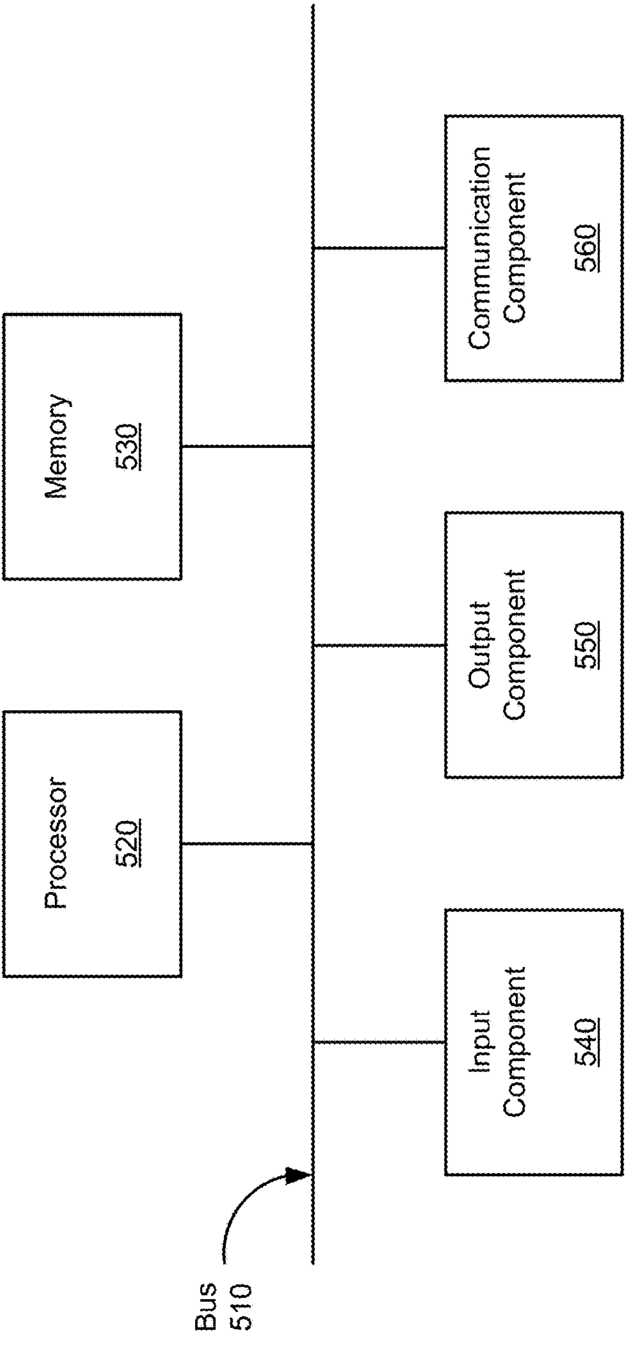
FIG. 5 is a diagram of example components of one or more devices of FIG. 4, in accordance with some embodiments of the present disclosure.

FIG. 5 is a diagram of example components of a device 500 associated with user verification with state machines. The device 500 may correspond to a client device, a first user device, and/or a second user device. In some implementations, the client device, the first user device, and/or the second user device may include one or more devices 500 and/or one or more components of the device 500. As shown in FIG. 5, the device 500 may include a bus 510, a processor 520, a memory 530, an input component 540, an output component 550, and/or a communication component 560.

The bus 510 may include one or more components that enable wired and/or wireless communication among the components of the device 500. The bus 510 may couple together two or more components of FIG. 5, such as via operative coupling, communicative coupling, electronic coupling, and/or electric coupling. For example, the bus 510 may include an electrical connection (e.g., a wire, a trace, and/or a lead) and/or a wireless bus. The processor 520 may include a central processing unit, a graphics processing unit, a microprocessor, a controller, a microcontroller, a digital signal processor, a field-programmable gate array, an application-specific integrated circuit, and/or another type of processing component. The processor 520 may be implemented in hardware, firmware, or a combination of hardware and software. In some implementations, the processor 520 may include one or more processors capable of being programmed to perform one or more operations or processes described elsewhere herein.

The memory 530 may include volatile and/or nonvolatile memory. For example, the memory 530 may include random access memory (RAM), read only memory (ROM), a hard disk drive, and/or another type of memory (e.g., a flash memory, a magnetic memory, and/or an optical memory). The memory 530 may include internal memory (e.g., RAM, ROM, or a hard disk drive) and/or removable memory (e.g., removable via a universal serial bus connection). The memory 530 may be a non-transitory computer-readable medium. The memory 530 may store information, one or more instructions, and/or software (e.g., one or more software applications) related to the operation of the device 500. In some implementations, the memory 530 may include one or more memories that are coupled (e.g., communicatively coupled) to one or more processors (e.g., processor 520), such as via the bus 510. Communicative coupling between a processor 520 and a memory 530 may enable the processor 520 to read and/or process information stored in the memory 530 and/or to store information in the memory 530.

The input component 540 may enable the device 500 to receive input, such as user input and/or sensed input. For example, the input component 540 may include a touch screen, a keyboard, a keypad, a mouse, a button, a microphone, a switch, a sensor, a global positioning system sensor, an accelerometer, a gyroscope, and/or an actuator. The output component 550 may enable the device 500 to provide output, such as via a display, a speaker, and/or a light-emitting diode. The communication component 560 may enable the device 500 to communicate with other devices via a wired connection and/or a wireless connection. For example, the communication component 560 may include a receiver, a transmitter, a transceiver, a modem, a network interface card, and/or an antenna.

The device 500 may perform one or more operations or processes described herein. For example, a non-transitory computer-readable medium (e.g., memory 530) may store a set of instructions (e.g., one or more instructions or code) for execution by the processor 520. The processor 520 may execute the set of instructions to perform one or more operations or processes described herein. In some implementations, execution of the set of instructions, by one or more processors 520, causes the one or more processors 520 and/or the device 500 to perform one or more operations or processes described herein. In some implementations, hardwired circuitry may be used instead of or in combination with the instructions to perform one or more operations or processes described herein. Additionally, or alternatively, the processor 520 may be configured to perform one or more operations or processes described herein. Thus, implementations described herein are not limited to any specific combination of hardware circuitry and software.

The number and arrangement of components shown in FIG. 5 are provided as an example. The device 500 may include additional components, fewer components, different components, or differently arranged components than those shown in FIG. 5. Additionally, or alternatively, a set of components (e.g., one or more components) of the device 500 may perform one or more functions described as being performed by another set of components of the device 500.

Figure 6:
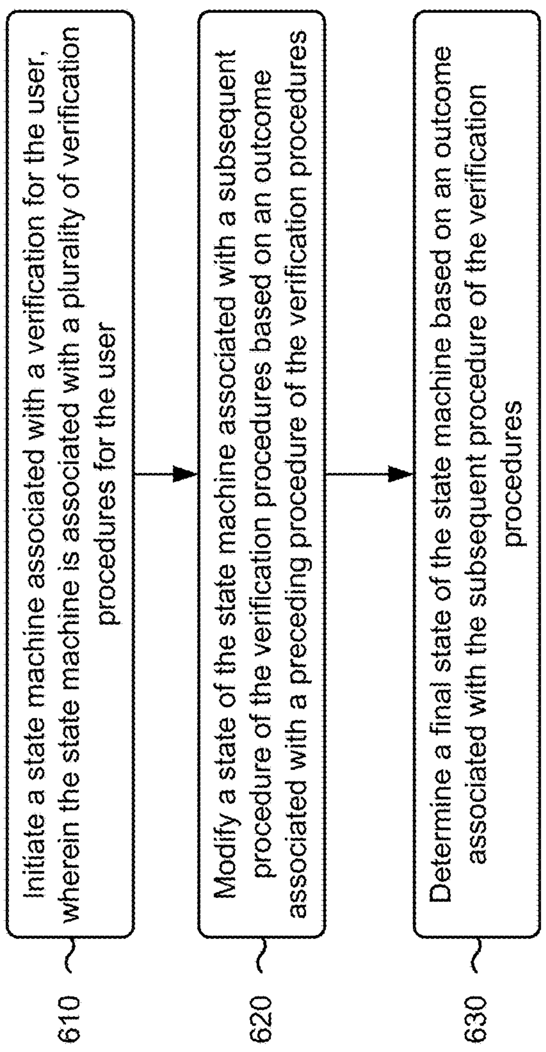
FIGS. 6-7 are flowcharts of example processes relating to user verification with state machines, in accordance with some embodiments of the present disclosure.

FIG. 6 is a flowchart of an example process 600 associated with user verification with state machines. In some implementations, one or more process blocks of FIG. 6 may be performed by the verification system 401. In some implementations, one or more process blocks of FIG. 6 may be performed by another device or a group of devices separate from or including the verification system 401, such as the client device 430, the first user device 440, and/or the second user device 450 Additionally, or alternatively, one or more process blocks of FIG. 6 may be performed by one or more components of the device 500, such as processor 520, memory 530, input component 540, output component 550, and/or communication component 560.

As shown in FIG. 6, process 600 may include initiating a state machine associated with a verification for the user, wherein the state machine is associated with a plurality of verification procedures for the user (block 610). For example, the verification system 401 (e.g., using processor 520 and/or memory 530) may initiate a state machine associated with a verification for the user, wherein the state machine is associated with a plurality of verification procedures for the user, as described above in connection with reference number 110 of FIG. 1A.

As further shown in FIG. 6, process 600 may include modifying a state of the state machine associated with a subsequent procedure of the verification procedures based on an outcome associated with a preceding procedure of the verification procedures (block 620). For example, the verification system 401 (e.g., using processor 520 and/or memory 530) may modify a state of the state machine associated with a subsequent procedure of the verification procedures based on an outcome associated with a preceding procedure of the verification procedures, as described above in connection with reference number 125 of FIG. 1B or reference number 150 of FIG. 1C.

As further shown in FIG. 6, process 600 may include determining a final state of the state machine based on an outcome associated with the subsequent procedure of the verification procedures (block 630). For example, the verification system 401 (e.g., using processor 520 and/or memory 530) may determine a final state of the state machine based on an outcome associated with the subsequent procedure of the verification procedures, as described above in connection with reference number 170 of FIG. 1D.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel. The process 600 is an example of one process that may be performed by one or more devices described herein. These one or more devices may perform one or more other processes based on operations described herein, such as the operations described in connection with FIGS. 1A-1E, 2A-2C, and/or 3A-3F.

Figure 7:
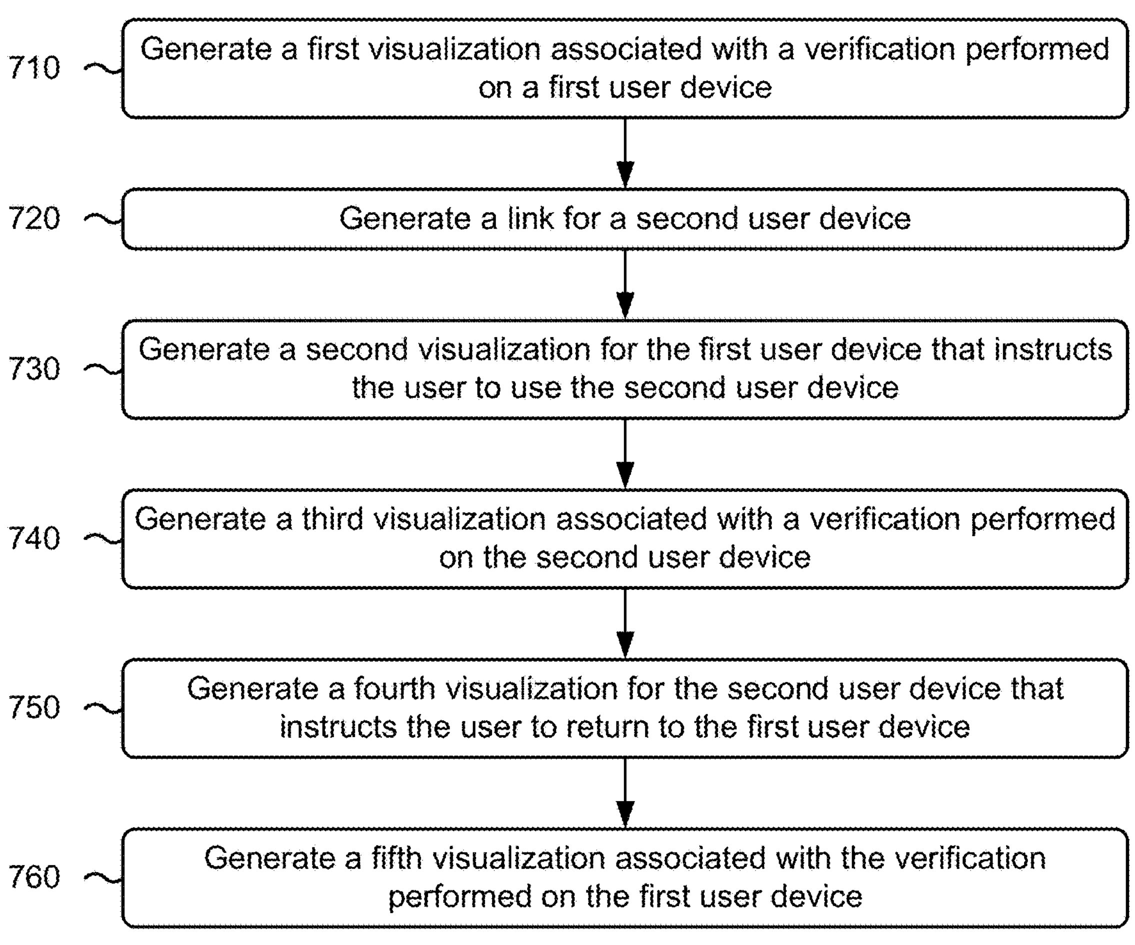

FIG. 7 is a flowchart of an example process 700 associated with user verification with state machines. In some implementations, one or more process blocks of FIG. 7 may be performed by the verification system 401. In some implementations, one or more process blocks of FIG. 7 may be performed by another device or a group of devices separate from or including the verification system 401, such as the client device 430, the first user device 440, and/or the second user device 450. Additionally, or alternatively, one or more process blocks of FIG. 7 may be performed by one or more components of the device 500, such as processor 520, memory 530, input component 540, output component 550, and/or communication component 560.

As shown in FIG. 7, process 700 may include generating a first visualization associated with a verification performed on a first user device (block 710). For example, the verification system 401 (e.g., using processor 520 and/or memory 530) may generate a first visualization associated with a verification performed on a first user device, as described above in connection with reference number 115 of FIG. 1A.

As further shown in FIG. 7, process 700 may include generating a link for a second user device (block 720). For example, the verification system 401 (e.g., using processor 520 and/or memory 530) may generate a link for a second user device, as described above in connection with reference number 135 of FIG. 1B.

As further shown in FIG. 7, process 700 may include generating a second visualization for the first user device to provide an instruction to use the second user device (block 730). For example, the verification system 401 (e.g., using processor 520 and/or memory 530) may generate a second visualization for the first user device to provide an instruction to use the second user device, as described above in connection with reference number 130 of FIG. 1B.

As further shown in FIG. 7, process 700 may include generating a third visualization associated with a verification performed on the second user device (block 740). For example, the verification system 401 (e.g., using processor 520 and/or memory 530) may generate a third visualization associated with a verification performed on the second user device, as described above in connection with reference number 140 of FIG. 1B.

As further shown in FIG. 7, process 700 may include generating a fourth visualization for the second user device to provide an instruction to return to the first user device (block 750). For example, the verification system 401 (e.g., using processor 520 and/or memory 530) may generate a fourth visualization for the second user device to provide an instruction to return to the first user device, as described above in connection with reference number 155 of FIG. 1C.

As further shown in FIG. 7, process 700 may include generating a fifth visualization associated with the verification performed on the first user device (block 760). For example, the verification system 401 (e.g., using processor 520 and/or memory 530) may generate a fifth visualization associated with the verification performed on the first user device, as described above in connection with reference number 160 of FIG. 1C.

Although FIG. 7 shows example blocks of process 700, in some implementations, process 700 may include additional blocks, fewer blocks, different blocks, or differently arranged blocks than those depicted in FIG. 7. Additionally, or alternatively, two or more of the blocks of process 700 may be performed in parallel. The process 700 is an example of one process that may be performed by one or more devices described herein. These one or more devices may perform one or more other processes based on operations described herein, such as the operations described in connection with FIGS. 1A-1E, 2A-2C, and/or 3A-3F.

The foregoing disclosure provides illustration and description, but is not intended to be exhaustive or to limit the implementations to the precise forms disclosed. Modifications may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A system for verifying a user, the system comprising:

one or more memories; and one or more processors, communicatively coupled to the one or more memories, configured to:

initiate a state machine associated with a verification for the user, wherein the state machine is associated with a plurality of verification procedures for the user;

modify, for a subsequent procedure of the plurality of verification procedures following a preceding procedure of the plurality of verification procedures, a state of the state machine from an inactive state to an active state based on an outcome associated with the preceding procedure, wherein the active state is associated with a rule that prevents modifying the active state to the inactive state for the subsequent procedure;

re-modify the state of the state machine associated with the subsequent procedure based on an outcome associated with a repetition of the subsequent procedure; and determine a final state of the state machine based on the outcome associated with the repetition of the subsequent procedure.

2. The system of claim 1, wherein the one or more processors are further configured to:

refrain from performing a repetition of the preceding procedure.

3. The system of claim 1, wherein the one or more processors are further configured to:

re-modify the state of the state machine associated with the preceding procedure from failed to active; and re-modify the state of the state machine associated with the subsequent procedure from failed to active, wherein the state of the state machine associated with the preceding procedure is associated with a rule that prevents modifying a failed state to an active state unless the state of the state machine associated with the subsequent procedure is in an active state.

4. The system of claim 1, wherein the preceding procedure is associated with a verification of public information associated with the user.

5. The system of claim 1, wherein the subsequent procedure is associated with a verification of an image, a video, or a document associated with the user.

6. The system of claim 1, wherein the one or more processors are further configured to:

transmit, to a user device associated with the user, an indication of the final state.

7. The system of claim 1, wherein the final state comprises an overall pass state or an overall fail state.

8. The system of claim 1, wherein the preceding procedure is performed on a first user device and the subsequent procedure is performed on a second user device.

9. A method of verifying a user, comprising:

initiating a state machine associated with a verification for the user, wherein the state machine is associated with a plurality of verification procedures for the user;

modifying, for a subsequent procedure of the plurality of verification procedures following a preceding procedure of the plurality of verification procedures, a state of the state machine from an inactive state to an active state based on an outcome associated with the preceding procedure, wherein the active state is associated with a rule that prevents modifying the active state to the inactive state for the subsequent procedure;

modifying the state of the state machine associated with the subsequent procedure based on an outcome associated with a repetition of the subsequent procedure; and determining a final state of the state machine based on the outcome associated with the repetition of the subsequent procedure.

10. The method of claim 9, wherein modifying the state from inactive state to the active state is based on the outcome being a failed outcome.

11. The method of claim 9, wherein the subsequent procedure comprises video analysis of a selfie video representing the user for at least one second.

12. The method of claim 9, further comprising:

transmitting, to a client device, an indication of the outcome associated with the preceding procedure and the outcome associated with the repetition of the subsequent procedure.

13. The method of claim 9, further comprising:

transmitting, to a user device associated with the user, an indication of the final state.

14. The method of claim 9, wherein the final state comprises an overall pass state or an overall fail state.

15. A non-transitory computer-readable medium storing a set of instructions, the set of instructions comprising:

one or more instructions that, when executed by one or more processors of a device, cause the device to:

initiate a state machine associated with a verification for a user, wherein the state machine is associated with a plurality of verification procedures for the user;

modify, for a subsequent procedure of the plurality of verification procedures following a preceding procedure of the plurality of verification procedures, a state of the state machine from an inactive state to an active state based on an outcome associated with the preceding procedure, wherein the active state is associated with a rule that prevents modifying the active state to the inactive state for the subsequent procedure;

modify the state of the state machine associated with the subsequent procedure based on an outcome associated with a repetition of the subsequent procedure; and determine a final state of the state machine based on the outcome associated with the repetition of the subsequent procedure.

16. The non-transitory computer-readable medium of claim 15, wherein the preceding procedure is associated with a verification of public information associated with the user.

17. The non-transitory computer-readable medium of claim 15, wherein the subsequent procedure is associated with a verification of an image, a video, or a document associated with the user.

18. The non-transitory computer-readable medium of claim 15, wherein the final state comprises an overall pass state or an overall fail state.

19. The non-transitory computer-readable medium of claim 15, wherein the preceding procedure is performed on a first user device and the subsequent procedure is performed on a second user device.

20. The non-transitory computer-readable medium of claim 15, wherein the one or more instructions that, when executed by one or more processors of a device, cause the device to:

transmit, to a user device associated with the user, an indication of the final state.

* * * * *